United States Patent

Beury, III et al.

[15] 3,673,868

[45] July 4, 1972

[54] TEMPERATURE PROBE

[72] Inventors: James Prescott Beury, III, Upper Montclair; Robert Ernest Burridge, Montclair, both of N.J.

[73] Assignee: Becton, Dickinson & Company, East Rutherford, N.J.

[22] Filed: May 6, 1970

[21] Appl. No.: 35,006

[52] U.S. Cl. ..................................73/343 R, 73/362 AR
[51] Int. Cl. ..............................G01k 1/10, G01k 1/08
[58] Field of Search ..................73/362 AR, 343 B, 343 R; 206/16.5; 292/19, 87, 299; 248/315

[56] References Cited

UNITED STATES PATENTS

| 3,349,896 | 10/1967 | Ensign et al. | 73/362 |
| 3,254,533 | 6/1966 | Tongret | 73/362 |
| 2,855,773 | 10/1958 | Evans | 292/19 |
| 738,960 | 9/1903 | Vaughan | 206/16.5 |
| 3,500,280 | 3/1970 | Ensign | 73/362 |

Primary Examiner—Louis R. Prince
Assistant Examiner—Denis E. Corr
Attorney—Kane, Dalsimer, Kane, Sullivan and Kurucz

[57] ABSTRACT

An improved temperature measuring probe is provided, including a sensing element having a probe head attached at the forward end and a handle connected to the rearward end. The probe is designed for use with an elastic cot designed to fit over the sensing element and to be releasably secured to the handle. To this end a flange extends about the forward portion of the handle. A pair of diametrically opposed slits extend into the handle from the forward end bisecting the flange. The halves of the flange are normally spaced apart a distance sufficient to engage an annular ring at the open end of the associated cot. Upon the application of a sufficient force, the halves of the flange may be shifted toward one aNother to enable the cot ring to override the flange.

8 Claims, 4 Drawing Figures

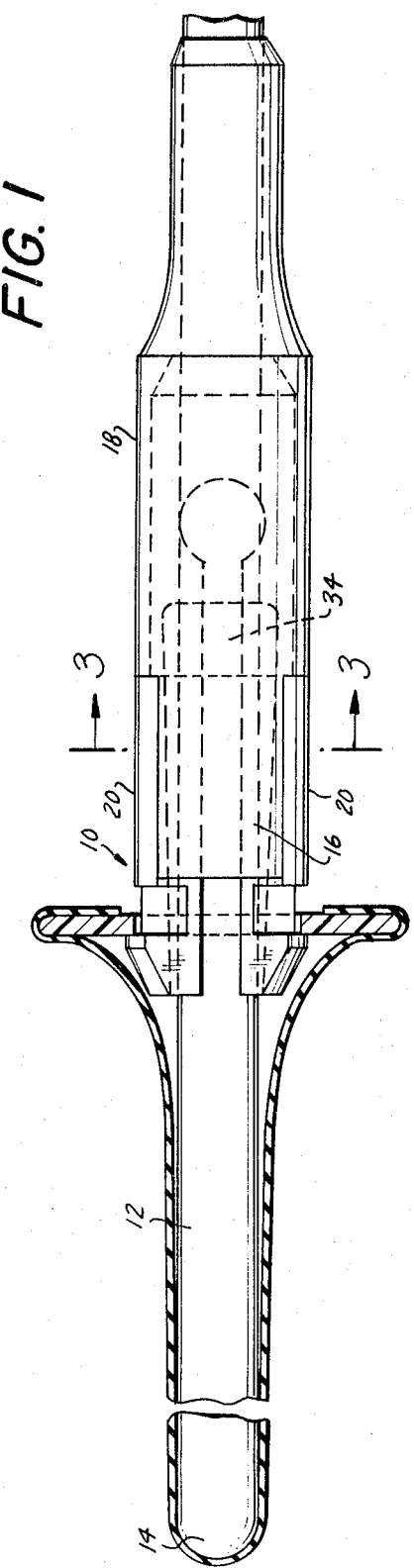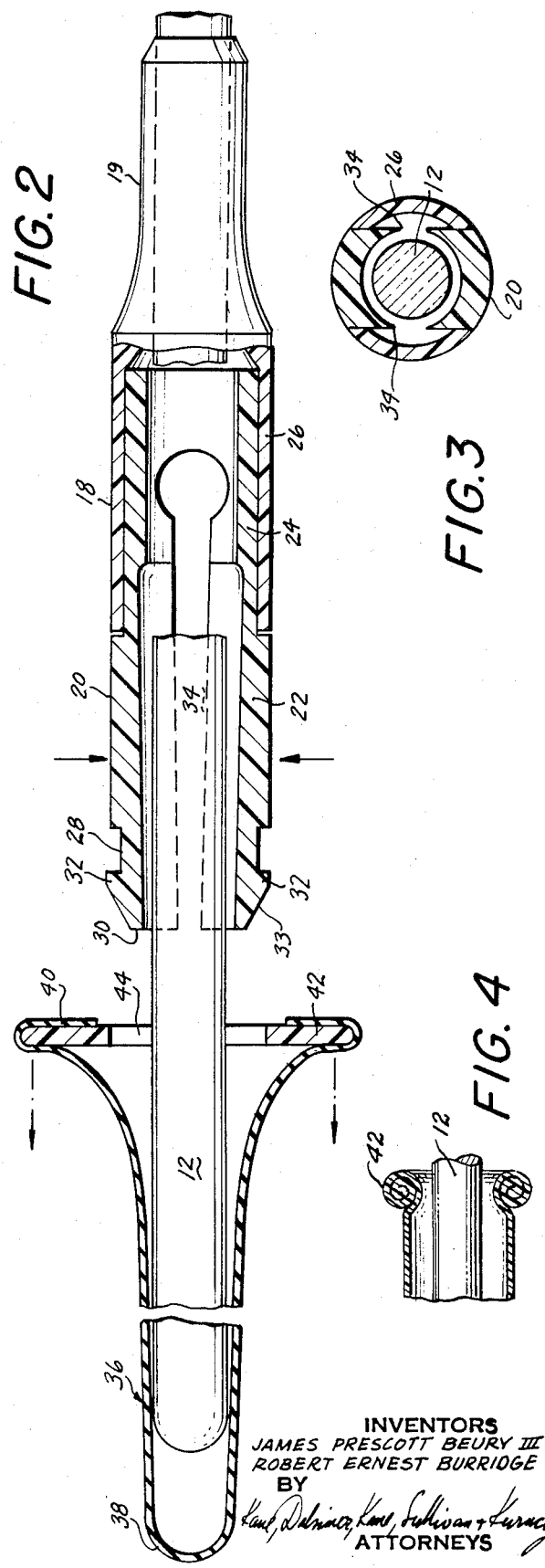

TEMPERATURE PROBE

BACKGROUND OF THE INVENTION

Electronic probes, such as electronic thermometers, are well known and defined in the medical and clinical arts. Since such probes are used with a large number of patients, it is desirable to protect the probe head, that is, the portion of the sensing element that comes in actual contact with each patient, with a disposable cover or cot which may be discarded after each use. The obvious purpose of such a cot is to protect against contamination from patient to patient.

It is the principle object of the present invention to provide an improved probe adapted to receive an associated disposable cot in a manner which securely retains the cot in position about the probe sensing element during use, but which readily ejects a spent cot after each use, without necessitating that the spent cot be actually handled by the technician administering the probe.

SUMMARY OF THE INVENTION

The above and other beneficial objects and advantages are attained in accordance with the present invention by providing a measuring probe having a sensing element with a probe head (such as a thermistor) at one end and a handle connected to the other end, and means coupled to the handle adapted to releasably secure a protective cot about the sensing element. Means are connected to the securing means for shifting the securing means between a cot retaining position and cot release position. The protective cot comprises an elongated member formed of an elastic material such as latex. One end of the cot is sealed and the other end is open and provided with means for interengagement with the securing means. The overall length of the cot is less than that of the sensing head so that the cot must be stretched in order for the coupling means of the cot to engage with the securing means of the probe. The natural resiliency of the elastic cot serves to "shoot" or eject a spent cot off the sensing head when the securing means is shifted to the release position.

BRIEF DESCRIPTION OF THE DRAWING

In the accompanying drawing:

FIG. 1 is a side-elevational-sectional view of a measuring probe in accordance with the present invention provided with an associated cot which is securely coupled to the sensing head of the probe;

FIG. 2 is a view similar to FIG. 1 illustrating the condition of the probe when a spent cot is ejected;

FIG. 3 is a sectional view taken along reference lines 3—3 of FIG. 1 in the direction indicated by the arrows; and, FIG. 4 is a fragmentary elevational sectional view illustrating an alternate embodiment of the cot ring formed by rolling the open end of the cot upon itself several times.

DETAILED DESCRIPTION OF THE PREFERRED EMBODIMENT

The present invention is illustrated in the accompanying drawing wherein similar components bear the same reference numeral throughout the several views. Reference is now made to FIG. 1 in particular wherein a temperature measuring probe 10 is shown comprising an elongated sensing element 12 having a shank portion, a free front end 14 provided with a probe head and a rear terminal portion 16 which extends into a handle 18 and is suitably secured to the back 19 of the handle such as by means of a potting epoxy. The probe head is formed of a suitable heat conducting material and electrical leads extend from the probe head through the sensing element and the handle to associated electronic equipment (not shown).

Handle 18 comprises an elongated hollow cylindrical member, formed of two generally cylindrical sections 22 and 26. The handle may be formed of any suitable, somewhat resilient material such as plastic. The first tubular section 22 extends for substantially the entire length of the handle and includes the forward portion 20 of the handle. The rear terminal portion 24 of first section 22 is inwardly stepped and a second tubular section 26 forms an outer shell for the rear of the first portion. The back 19 of the handle and hence the probe is cemented in place to the rear of section 26. A bore substantially equal to the outside diameter of the sensing element extends through the first section and receives the sensing element.

A recess 28 extends circumferentially about the first section 22 proximal the front end 30 of the handle. The recess cooperates with front end 30 in defining flange 32 which, thus, extends circumferentially about the handle. The front portion of the handle 33 between end 30 and flange 32 is tapered at an angle of approximately 60°. A pair of diametrically opposed slots 34 extend rearwardly into the handle from front end 30 for the major portion of the length of the handle, thus splitting the forward portion of the handle including flange 32 into two halves.

The cot 36, to be associated with the probe, comprises an elongated tubular member formed of an elastic material, such as latex. The front end 38, of the cot, is closed and the rear end 40 is open. An annular ring 42 is positioned about the rear end of the cot with bore 44 of the ring defining the sole opening into the cot interior. The ring 42 may comprise a separate disc of relatively rigid material, as illustrated, or alternatively, the ring may be formed by rolling over the open end of the cot upon itself several times as shown in FIG. 4. The diameter of the bore 44 of ring 42 is slightly less than the diameter of first section 22 of handle 18 measured at the highest point of flange 32 but somewhat greater than the diameter of the handle measured at recess 28.

The overall length of cot 36 is less than the distance from the front end 14 of sensor element 12 to recess 28 of handle 18. However, due to the elasticity of the cot, it may be stretched as shown in FIG. 1 to extend over the entire sensing head 12 and up to recess 28.

In operation, a cot is first applied over the sensing element 12 of probe 10 by applying a transverse force to the approximate midpoint of section 22 of the handle as shown by the arrows in FIG. 2. The force may conveniently be applied by squeezing the probe with thumb and second finger. Alternately, the camming surface 33 on the front of the handle cooperates in automatically applying the necessary force on the handle when a cot is longitudinally shifted rearwardly along the handle. The force compresses the space between the handle halves and thus enables the bore 44 of ring 42 to override the front of the handle and rest in recess 28. When the force is removed, the forward end 30 of both halves of first section 22 lift away from the sensing head so that the halves of flange 32 tend to lock the ring in position. The probe is then used and measurement taken. After use a transverse force is applied as shown in FIG. 2 thereby releasing ring 40 from its interengagement with flange 32. The natural elasticity of the cot then serves to eject the cot from the sensing head without necessitating its being further handled.

In a preferred practice of the present invention, the handle was formed of a rigid vinyl. The outside diameter of the handle measured at flange 32 was 0.425 in. Each slot 34 was 0.019 in. The diameter of recess 28 was 0.375 in. and the inside diameter 44 of the associated cot ring 42 was also 0.375 in.

It can thus be appreciated that in accordance with the teachings of our invention an improved medical probe is provided which meets the aforementioned objectives. It should be understood that modifications may be made in the illustrated and described embodiment of my invention without departing from the invention as set forth in the accompanying claims.

Having thus described our invention, what we claim is:

1. In combination: a measuring probe; a sensing element of said probe, said sensing element comprising an elongated member having a shank portion, a free front end, and a rear end connected to a handle; a handle disposed about portions of said sensing element; securing means coupled to said handle adapted to releasably secure a protective cot about said sensing element, said securing means including a flange disposed about said handle, said flange being transversely shiftable with respect to said shank; means connected to said securing means for enabling the shifting of said securing means between a cot retaining position and a cot release position; a protective cot adapted for placement over said sensing element, said cot including an elongated member formed of an elastic material, a closed front end of said elastic member, an open rear end of said elastic member; and, a relatively rigid annular ring disposed about said open end defining an opening into the interior of said cot, the inside diameter of said ring being substantially equal to the cross-sectional dimension of said flange measured when said flange is in said release position.

2. The invention in accordance with claim 1 wherein said handle comprises a generally elongated member coaxial with said sensing element, a front section of said handle extending over portions of said shank, a recess extending about said handle front section proximal the front end of said handle defining said flange and a pair of diametrically opposed slits in said handle front section extending rearwardly from said handle front end whereby to separate said handle front section into two halves.

3. The invention in accordance with claim 2 wherein said handle front section tapers outwardly from said handle front end to said flange and the diameter of said handle front end is less than the inside diameter of said cot ring and the diameter of said flange is greater than the inside diameter of said ring.

4. The invention in accordance with claim 2 wherein the length of said cot body portion when relaxed is less than the distance measured from the front end of said sensing element to the handle flange and wherein said cot is formed of a material sufficiently elastic, to enable said cot to be stretched to said distance.

5. The invention in accordance with claim 1 wherein said relatively rigid annular ring comprises the open end of said cot rolled over on itself.

6. A measuring probe for association with a removable elongated cot formed of an elastic material having a closed front end, an open rear end and a relatively rigid annular ring disposed about said open end defining an opening into the interior of said cot, said probe comprising: a sensing element including an elongated member having a shank portion, a free front end containing a probe head, and a rear end connected to a handle; a handle connected to one end of said element; securing means coupled to said handle adapted to releasably secure said cot about said sensing element, said securing means including a recessed portion extending about said handle defining a flange, said flange being transversely shiftable with respect to said shank; and means connected to said securing means for enabling the shifting of said securing means between a cot retaining position and a cot release position.

7. The invention in accordance with claim 6 wherein said handle comprises a generally elongated member coaxial with said sensing element, a front section of said handle extending over portions of said shank, a recess extending about said handle front section proximal the front end of said handle defining said flange, and a pair of diametrically opposed slits in said handle front portion extending rearwardly from said handle front end whereby to separate said handle front section into two halves.

8. The invention in accordance with claim 7 wherein said handle front section tapers outwardly from said handle front end to said flange and the diameter of said handle front end is less than the inside diameter of said cot ring and the diameter of said flange is greater than the inside diameter of said ring.

* * * * *